Sept. 8, 1964   MARIE ARCHER NÉE CHESNAIS   3,147,586
CHAIN
Filed Sept. 18, 1962                       2 Sheets-Sheet 1
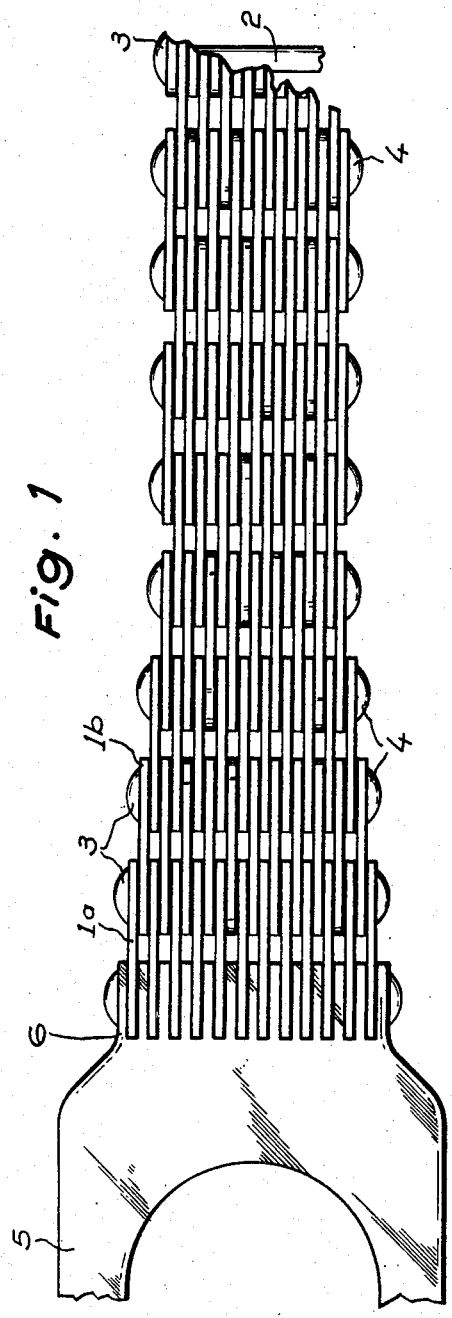
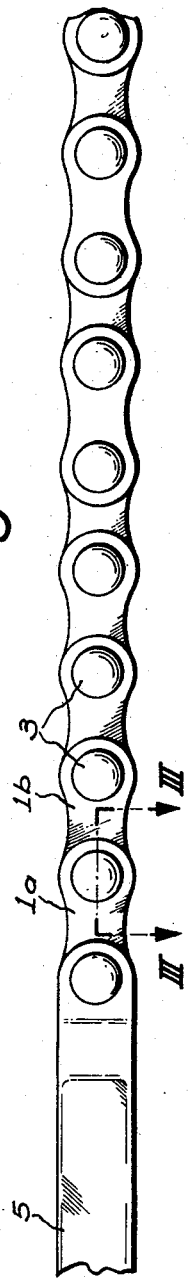

Fig. 3
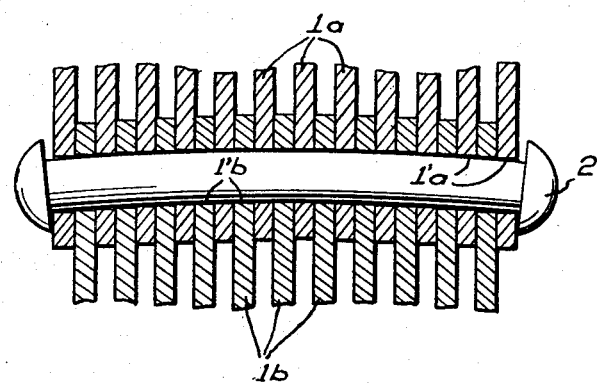
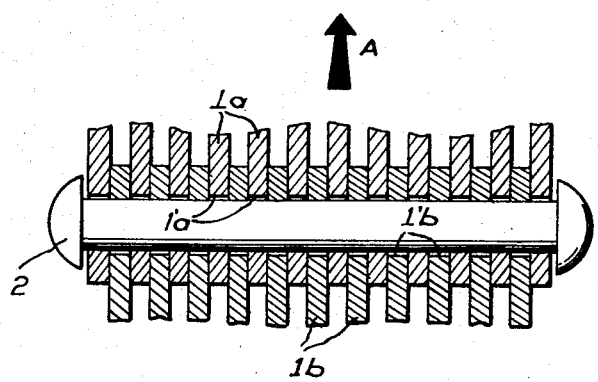
Fig. 4

United States Patent Office 3,147,586
Patented Sept. 8, 1964

3,147,586
CHAIN
Marie Archer, née Chesnais, 2 Hameau des Perdrix,
La Celle-Saint-Cloud, Seine-et-Oise, France
Filed Sept. 18, 1962, Ser. No. 224,337
Claims priority, application France, Sept. 21, 1961,
873,764; Apr. 5, 1962, 893,375
5 Claims. (Cl. 59—78)

This invention relates to close-linked chains, that is to say the chains wherein the elements are constituted by plates or links disposed side-by-side, the plates of one element being placed in quincunxes in relation to the plates of the following element and being connected thereto by a spindle serving as pivot for the two elements and constituted for example by a bolt or by a rivet.

These chains possess the advantage of being relatively flat while being strong, permitting them to be slipped beneath a load to be raised, which is situated very close for example to the ground.

Such a chain is fixed at its ends to an attachment element, for example to a hook or a ring. The simplest solution for the effecting of this securing would consist in providing the body of the attachment element with slots in which the plates of the last element would be engaged and in fixing these plates to the body by a rod forming a pivot. However while it is easy to make the plates of a steel having a high traction strength, the attachment element has a much lower strength. As the slots in the attachment element form tongues the thickness of which is equal to that of the plates and the number of which differs by only one from that of the plates of the end element, the attachment element determines the strength of the chain and therefore hitherto it has not been possible to profit by the use of plates of great strength.

The present invention has for its object a close-linked chain improved in such fashion as to remedy the above-indicated drawback.

According to the invention, the end portion of the chain intended to be connected to an attachment element is formed by elements comprising a number of plates higher than the number constituting the normal elements, this number of plates in the elements of the end portion of the chain increasing regularly from a region close to the actual end to this end, in preferred fashion.

It is then possible to fix the chain to the attachment element in the manner described above while imparting a great strength to the chain. In fact the attachment element then comprises a number of securing tongues which is higher than the number of plates of a normal element of the chain, thus counter-balancing the reduced strength of the metal constituting the attachment element.

Naturally the chain can be secured to the attachment element in any other manner, for example in the manner as described in French patent specification No. 1,203,107, filed July 21, 1958, by the applicant, which manner consists in disposing cross-pieces of thickness substantially equal to that of the plates of the chain between the different plates of the last link, in such fashion as to wedge these plates to one another and to form a practically rigid surface, and in welding this surface to the attachment element.

In an advantageous form of embodiment of the invention, the diameter of the spindles is less than the diameter of the holes of the links in such fashion as to permit buckling of these spindles by at least 0.2%, in their assembly.

With this arrangement, the spindles have a flexion when the chain is at rest, but become rectilinear on traction. However no shock is produced between spindles and links, since the spindles are always in contact with the links.

A form of embodiment of a close-linked chain in accordance with the invention will be described hereinafter, by way of non-limitative example, with reference to the accompanying drawings wherein:

FIGURE 1 is a plan view of one of the ends of the chain.

FIGURE 2 is a profile view thereof.

FIGURE 3 is a partial sectional view of the chain along the line III—III in FIGURE 2.

FIGURE 4 is a partial sectional view of the same chain subjected to a traction force.

As shown in the drawings, the close-linked chain is constituted by elements formed of plates or links, such as 1a and 1b disposed side-by-side, the plates of one element being placed in quincunxes in relation to the plates of the other element.

Two adjacent elements are united with one another by a rivet 2 provided with a head 3 at one of its ends, the other end being riveted as indicated at 4.

Each normal element of the chain comprises a number of plates which in the drawing is alternately eight or nine.

According to the invention, the end portion of the chain intended to be fixed to an attachment element 5 is formed by a series of elements the number of plates of which increases regularly from nine to twelve in the example represented.

The attachment element 5 comprises slots which are separated from one another by tongues 6 having the thickness of one plate and in which there are engaged the plates of the end element. The securing of these plates to the attachment element 5 is effected by a rivet which passes simultaneously through the tongues and the said plates.

It may be seen that in the drawing the element 5 comprises thirteen tongues 6 which can easily resist the same force as the eight plates 1 of a link of the chain, although the attachment element is not of high-strength steel.

As may be seen more particularly in FIGURE 3, a first row of plates or links 1a is united with a second row of links 1b by a rivet 2 which passes in holes 1'a and 1'b respectively in the rows of links 1a and 1b.

The diameter of the rivet 2 is less than that of the holes 1'a and 1'b, so that at the time of riveting the rivet 2 assumes a flexion of at least 0.2%, and even 2% without disadvantage, as represented. Thus a rivet of 50 mm. length will have a flexion of 1 mm.

Naturally the rivets of the complete chain assume multiple orientations, but they remain in contact with the links.

When the chain is subjected to a traction force (FIGURE 4) in the direction of the arrow A, the row of links 1a acts upon the rivet 2 in the same direction, while the row of links 1b, by reaction, tends to draw the rivet in the opposite direction. This rivet 2 is then flexed to become completely rectilinear.

Thus a force applied to the upper part of the chain will be transmitted to the lower part (thus to the load) only after flexing of all the rivets 2. A certain elastic elongation results therefrom, since the rivets 2 resume their original form as soon as the force ceases, giving to the chain a very great tractional resistance.

It is of course possible to use bolts and not rivets, but then it is necessary to cause their bending in the course of a special operation separate from the positioning, since the tightening of the nut does not have a longitudinal compression effect. On the other hand rivets permit the utilization of the invention with the greatest facility.

It is self-evident that the invention is not limited to the form of embodiment as described and represented, but on the contrary covers all varients thereof.

I claim:

1. A chain the elements of which are constituted by plates or links disposed side-by-side, the plates of one element being placed in quincunxes in relation to the plates of the following element and being connected thereto by a spindle serving as pivot for the two elements, wherein the end portion which is intended to be connected to an attachment element is formed by elements comprising a number of plates greater than the number of plates constituting the normal elements, which number increases continually from a region close to the actual end, to this end.

2. A chain as claimed in claim 1, wherein the diameter of the spindles is smaller than the diameter of the holes of the links, so as to permit a flexion of these spindles of at least 0.2% in their assembly.

3. A chain as claimed in claim 1 wherein said number increases to at least two greater than the number of plates constituting said normal elements.

4. The combination of a chain comprising a number of normal link elements extending along a major portion of the length of the chain and end link elements forming the opposite end portions of the chain, each of said link elements being made up of numbers of elongated plates having holes in their opposite ends and being arranged side-by-side in laterally spaced relation, the ends of said plates of each link element being interfitted between the ends of said plates of the next adjacent link element, a spindle extending through said holes of the interfitted ends of adjacent link elements for pivotally connecting said link elements in succession, the numbers of said plates in each of said end link elements being greater than the numbers of said plates in said normal link elements and increasing progressively from the latter to the end link elements at the ends of said chain; and attaching elements for said end link elements at the ends of the chain, said attaching elements each having a number of laterally spaced slots defining tongues therebetween with holes in the latter, said number of slots corresponding to the number of plates in said end link elements at the ends of the chain and receiving the ends of said corresponding number of plates, and spindles extending through said holes of the tongues and the holes of the ends of the plates in said slots for pivotally connecting said attaching elements to the ends of the chain.

5. The combination as in claim 4; wherein said holes in the ends of said plates are of a diameter larger than the diameter of the spindles extending therethrough, and said spindles are normally bowed at least 0.2% when said chain is free of load.

References Cited in the file of this patent
UNITED STATES PATENTS 2,883,738 Morrow _____ Apr. 28, 1959

FOREIGN PATENTS 521,943 Canada _____ Feb. 21, 1956
1,203,107 France _____ July 21, 1958